United States Patent [19]

Kennedy et al.

[11] Patent Number: 5,376,744

[45] Date of Patent: Dec. 27, 1994

[54] CARBOCATIONIC POLYMERIZATIONS IN SUPERCRITICAL $CO_2$

[75] Inventors: Joseph P. Kennedy; Tibor Pernecker, both of Akron, Ohio

[73] Assignee: The University of Akron, Akron, Ohio

[21] Appl. No.: 150,400

[22] Filed: Nov. 10, 1993

[51] Int. Cl.[5] ............................................. C08F 2/04
[52] U.S. Cl. .................................. 526/89; 526/348.7; 526/347; 526/339
[58] Field of Search ............................................. 526/89

[56] References Cited

U.S. PATENT DOCUMENTS

| | | |
|---|---|---|
| 3,522,228 | 7/1970 | Fukui et al. |
| 4,327,201 | 4/1982 | Kennedy et al. |
| 4,725,667 | 2/1988 | Kleinjens |
| 4,748,220 | 5/1988 | Hartmann et al. |
| 4,792,408 | 12/1988 | Titmas |
| 4,902,780 | 2/1990 | Bourrain et al. |
| 4,910,321 | 3/1990 | Kennedy et al. |
| 4,929,683 | 5/1990 | Kennedy et al. |
| 4,946,899 | 8/1990 | Kennedy et al. |
| 4,990,595 | 2/1991 | Traechkner et al. |
| 5,001,224 | 3/1991 | Barstow et al. |
| 5,049,328 | 9/1991 | Meyer et al. |
| 5,049,647 | 9/1991 | Al-Ghatta |
| 5,066,730 | 11/1991 | Kennedy et al. |
| 5,106,906 | 4/1992 | Meier et al. |
| 5,133,913 | 7/1992 | Miyakawa et al. |
| 5,169,914 | 12/1992 | Kaszas et al. |
| 5,225,492 | 7/1993 | Kennedy et al. |

OTHER PUBLICATIONS

A section from a book entitled "Carbocationic Polymerization" by Joseph P. Kennedy, Institute of Polymer Science, The University of Akron, Akron, Ohio, and Ernest Marechal, Laboratorie de Synthese Macromoleculaire, Universite Pierre et Marie Curie, Paris, France, pp. 2–27, John Wiley & Sons.

A section from a book entitled "Principles of Polymerization," Second Edition, George Odian, Professor of Chemistry, The College of Staten Island, The City University of New York, Staten Island, N.Y., pp. 364–367, John Wiley & Sons.

*Primary Examiner*—Joseph L. Schofer
*Assistant Examiner*—N. Sarofim
*Attorney, Agent, or Firm*—Hudak & Shunk Co.

[57] ABSTRACT

A process is disclosed for carbocationically polymerizing monomers having one or more carbon-carbon double bonds in a medium primarily of carbon dioxide at or above 31.1° C. and at or above 73 bars pressure. The supercritical carbon dioxide can replace traditional solvents for carbocationic polymerizations. While traditional solvents like methylene chloride do not function to allow polymers to form above cryogenic temperatures, it has been found that polymers can be formed at higher temperatures in this supercritical medium.

13 Claims, 3 Drawing Sheets

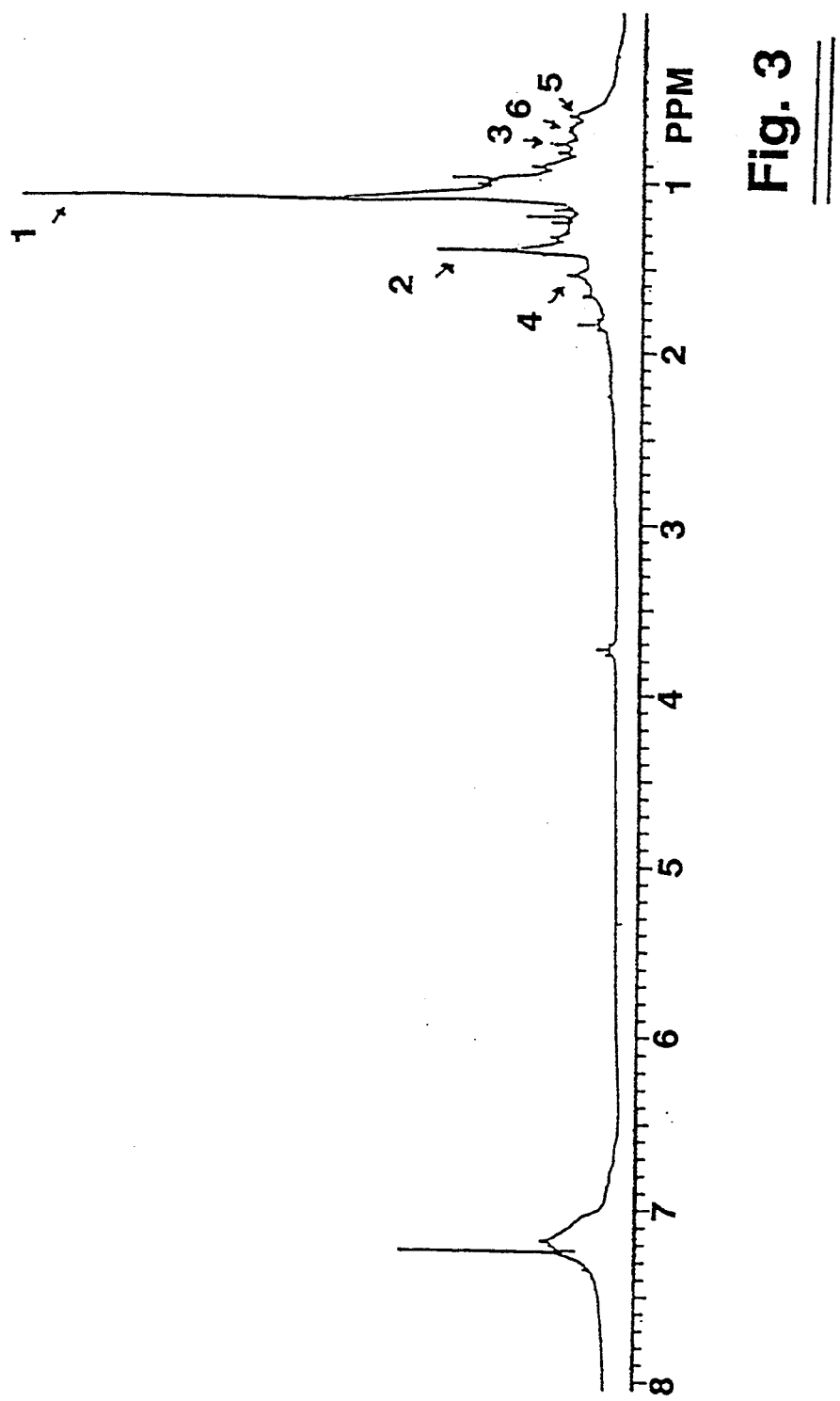

CARBOCATIONIC POLYMERIZATIONS IN SUPERCRITICAL $CO_2$

FIELD OF INVENTION

This invention relates to carbocationic polymerization of olefinic type monomers in supercritical carbon dioxide to produce polymers from said monomers. Other solvents may be dissolved in the carbon dioxide or the pressure and temperature may be changed to alter the polarity of the supercritical medium. The supercritical carbon dioxide has significantly superior properties to liquid carbon dioxide for use as a medium in carbocationic polymerizations. It was also unexpectedly found that the polymerization of isobutylene can be conducted at temperatures from 31° to 60° C. in this medium. The olefinic type monomers include isobutylene, dienes, styrenes, vinyl ethers and cycloaliphatic monomers having at least one carbon-carbon double bond. Polymers will be defined in this application as having molecular weights from several hundreds to in excess of one million.

BACKGROUND

Carbocationic polymerizations are well known and provide many polymers such as isobutylene polymers and copolymers (butyl rubber). They are also known for their ability to form block copolymers and telechelic polymers. They are typically conducted in chlorinated hydrocarbon solvents at temperatures between $-20$ and $-100°$ C. The chlorinated hydrocarbon solvents are used because they have sufficient polarity to stabilize the transition states, and thus lower the activation energy for ion generation in carbocationic polymerization. The low temperatures are used to slow the termination and chain transfer processes that limit the growth in the molecular weight of the polymer chains. Less polar solvents are less effective at stabilizing transition states, and thus fewer carbocations are produced that are active in polymerization. The solvent also needs to act as a fluid heat transfer medium to dissipate the heat of polymerization. The solvent should dissolve the ingredients of the polymerization.

Carbocationic polymerizations are described by J.P. Kennedy and E. Marechal in "Carbocationic Polymerization" published by Wiley-Interscience, New York, 1982. Carbocationic polymerizations are chain polymerizations where an active species (thought to be carbocations) is created from one or more terminal carbon atoms of a molecule (i.e., one molecule may have two or more carbocation termini). These active terminal carbons are capable of reacting with unsaturated carbons of olefinic type monomers forming a carbon-carbon single bond between the active terminal carbon and one of the unsaturated carbons in the olefin. In the course of this addition reaction, an active species is generated from a carbon in the olefin type monomer. Since an active cationic terminus is regenerated after each reaction of a terminal cation, the process can proceed to high molecular weight materials from unsaturated olefinic monomers.

Carbocationic polymerizations are distinguished from free radical and anionic polymerizations even though all three are chain polymerizations. Carbocationic polymerizations are thought to occur by adding monomers to a terminal carbocation. Radical polymerizations occur by adding monomers to a terminal free radical. Anionic polymerizations are characterized by adding monomers to a negatively charged terminal carbon. One skilled in polymerizations distinguishes these three polymerization types by the ability (or inability) to add olefinic monomers or copolymerize with certain monomers. These types of polymerizations may also be distinguished by their sensitivity to termination by various species known to terminate anions, cations, or free radicals. These matters are explained in George Odian's book "Principles of Polymerization" Wiley Interscience: New York, 2nd ed, pp 180-183, 340-341.

Attempts were made to carbocatienically polymerize isobutylene using coinitiators 2-chloro-2,4,4-trimethylpentane/$TiCl_4$ at $-50°$ C. in liquid carbon dioxide ($CO_2$) but this resulted in heterogeneous (precipitation) polymerizations and ill-reproducible results. R.H. Biddulph and P.H. Plesch, The Low-Temperature Polymerization of Isobutene. Part IV Exploratory Experiments., *J. Chem. Soc.*, 1966, 3913 (1960), discussed polymerizations of isobutylene in liquid $CO_2$ using $TiCl_4$ or $AlBr_3$.

Estimates were made of the highest probable molecular weight of a polyisobutylene obtainable at 41° C. in traditional chlorinated solvents by carbocationic techniques instead of at $-100°$. Based on the increase in the rates of chain termination and chain transfer at the higher temperature, it is anticipated based on extrapolation of the data in J. P. Kennedy Cationic Polymerization: A critical Inventory,"John Wiley Interscience, New York, 1975, that the molecular weight of the polymer produced would decrease from 1,000,000 at $-100°$ C. to about 400 at polymerization temperatures of 36° C.

Supercritical carbon dioxide (SC·$CO_2$) has been used for a variety of applications (e.g., to decaffeinate coffee, to liquify coal, to remove cholesterol from egg yolks) and a considerable body of knowledge exists on its use in extractions. Carbon dioxide is supercritical at and above 31.1° C. and at or above 73 atmospheres.

SUMMARY OF THE INVENTION

A process is disclosed for cationic polymerization in supercritical carbon dioxide at temperatures above 31.1° C. Cationic polymerizations are normally conducted at cryogenic temperatures of from $-20°$ to $-100°$ C. to maximize the molecular weight of the resulting polymer. The monomers polymerizable in this medium include isobutylene, styrenes, dienes, vinyl ethers, and cycloaliphatic monomers.

BRIEF DESCRIPTION OF FIGURES

FIG. 3 is a proton nuclear magnetic resonance spectroscopy trace for copolymers of isobutylene and styrene showing that resonances are present indicative of copolymerization of the two monomers within the polymer chains. The resonances 1-6 are associated with the protons in the structure as shown below.

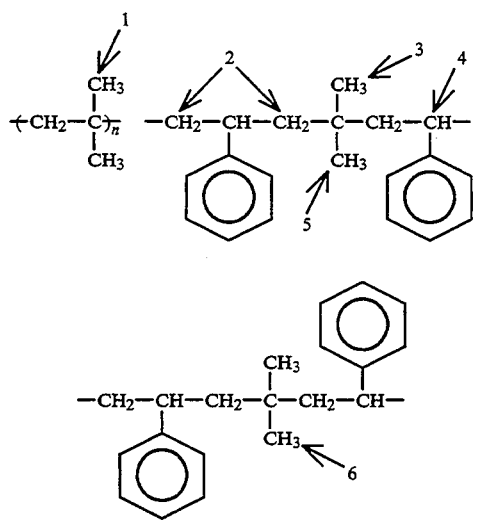

DETAILED DESCRIPTION OF THE INVENTION

Figure 1:
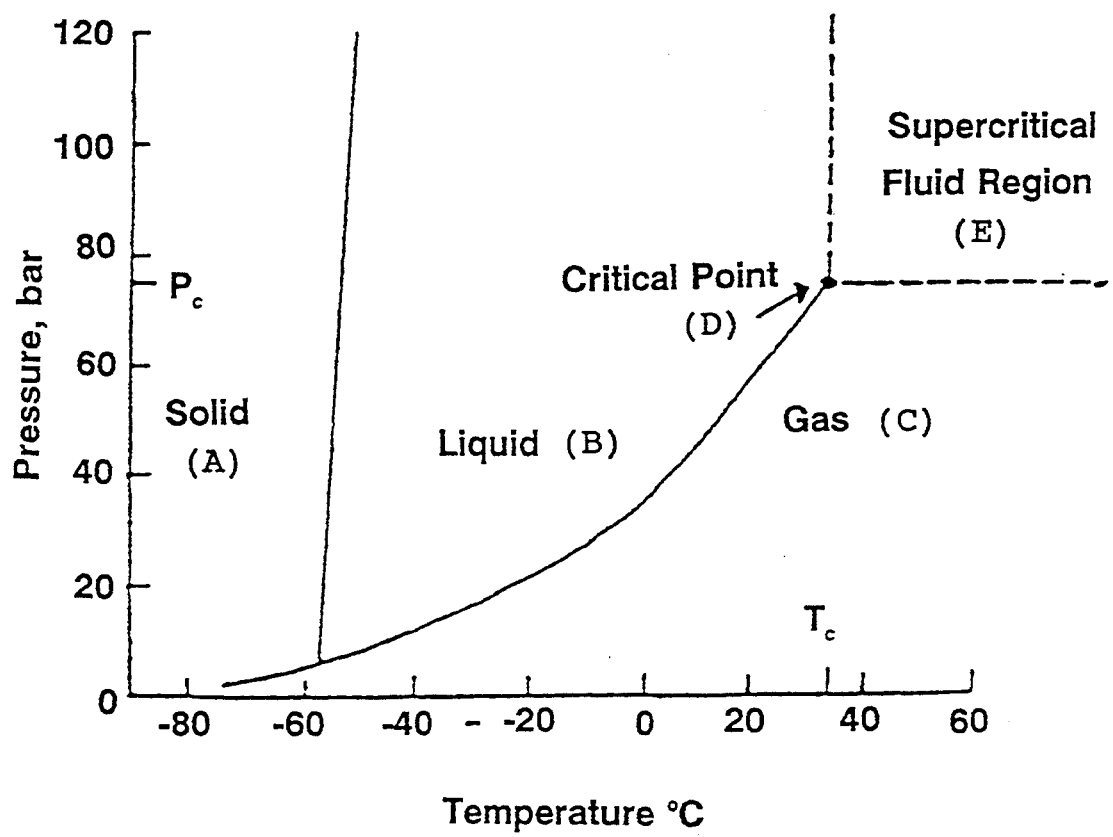
FIG. 1 is a phase diagram for carbon dioxide as a function of temperature and pressure. It shows the solid phase (A), liquid phase (B), gas phase (C), critical point (D), and supercritical region (E).

Carbocationic polymerizations are disclosed in systems comprising supercritical carbon dioxide at temperatures desirably from about 31° C. to about 60° C., more desirably from about 35° to 50° C., and preferably from 40° to 45° C. of monomers having at least one carbon-carbon double bond and capable of being carbocationically polymerized. Supercritical carbon dioxide (SC·CO$_2$) is defined as carbon dioxide (CO$_2$) above 31.1° C. and above 74 bar pressure. SC·CO$_2$ may contain a variety of solvents to enhance its ability to serve as the polymerization medium. Desirably, the cosolvents are limited to up to 70 wt. %, more desirably up to 50 wt. %, and preferably from 0 or 2–10 wt. %. Although the cosolvents are liquids at the polymerization temperature, they are homogeneously dissolved in the SC·CO$_2$. Thus, the CO$_2$ is desirably 30 wt. % or more of the medium, more desirably 50 wt. % or more and preferably 80 or 90 wt. % or more of the medium. Desirably, the SC·CO$_2$ has a pressure from about 74 bar to about 10,000 bar; more desirably from about 74 bar to about 3,000 bar; and preferably about 75 to about 200 bar. Monomer to medium weight ratios are up to about 0.25 or 0.30, and desirably from about 0.1 to about 0.20. The number average molecular weight of the oligomers and polymers can be from that of several monomer units up to several million and are desirably from about 1,000 to 1,000,000 and preferably from about 2,000 to about 100,000.

One of the utilities of using CO$_2$ as a medium above its supercritical point, such as temperatures from about 31.1° C. to about 60° C., for carbocationic polymerizations is that it saves the considerable expense in cooling the monomers, solvents and other reactants to temperatures from −20° to −100° C. The process also saves the cost of recovering chlorinated solvents conventionally used in carbocationic polymerizations and the cost to society from the unavoidable losses of chlorinated solvents into the atmosphere. CO$_2$ is environmentally non-hazardous and available in pure form from the liquefaction of air to recover N$_2$ and O$_2$. The chlorinated solvents which are replaced or substantially replaced by the CO$_2$ are environmentally hazardous. Academic and industrial users of carbocationic polymerizations exert great efforts to minimize the release of chlorinated solvents into the atmosphere. However, in spite of the efforts of skilled professionals, substantial amounts of these polymerization solvents are still released into the atmosphere.

A cationogen reactive with the Friedel-Crafts acid is required to induce polymerization. This may be a protic acid, or an alkyl halide having from 6 to 20 carbon atoms, such as TMPC1 (2-chloro-2,4,4-trimethylpentane) or a branched hydrocarbon having from 6 to 20 carbon atoms and at least one halide. Other examples of cationogens are:

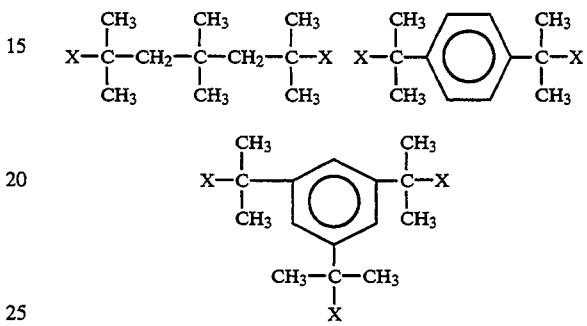

where X may be Cl, OH, or OCH$_3$.

Useful coinitiators include Friedel-Crafts acids such as TiCl$_4$, AlCl$_3$, AlBr$_3$, BF$_3$, BCl$_3$, SnCl$_4$, ZnCl$_2$, ZrCl$_4$, and the like. The preferred coinitiators are AlCl$_3$, BCl$_3$, SnCl$_4$, BF$_3$, TiCl$_4$, and their alkylated derivatives where the alkyl group desirably has from 1 to 4 carbon atoms. The coinitiators may be used as mixtures of coinitiators.

The preferred monomers have at least one carbon-carbon double bond and are capable of undergoing carbocationic polymerization. These monomers typically have from 4 to 20 carbon atoms along with hydrogen atoms and optionally oxygen atoms. Specific examples include isobutylene (IB); conjugated dienes having 4 to 8 carbon atoms such as isoprene, butadiene, etc; aromatic substituted vinyl monomers having from 8 to 12 carbon atoms such as styrene (St) or alkyl substituted styrenes; vinyl ethers having from 3 to 10 carbon atoms and cycloaliphatic monomers having from 1 to 2 double bonds and up to 10 carbon atoms such as pinenes ($\alpha$ and $\beta$).

The polymeric products of the polymerizations can be homopolymers, copolymers (block or random), functionalized polymers (either through the initiation reaction or the termination reaction), and polymeric intermediates. Preferred polymers include polyisobutylene, butyl rubber, and various styrene-diene copolymers. The polyisobutylene desirably has greater than 50 wt. % isobutylene units, more desirably >80 wt. % isobutylene units, and preferably >than 90 wt. % isobutylene units. The copolymers of isobutylene and styrene or alkyl styrenes desirably have greater than 50 wt. % isobutylene and (alkyl) styrene units and preferably >90 wt. % isobutylene and (alkyl) styrene units.

Cosolvents for the polymerization can include various halogenated solvents including brominated, fluorinated, or chlorinated solvents such as CH$_3$Cl, CH$_2$Cl$_2$, C$_2$H$_5$Cl, C$_6$H$_5$Cl; various alkanes having 4 to 12 carbon atoms; ethers having 4 to 12 carbon atoms; and acetonitrile. As previously recited, these solvents are homogeneously dissolved in the supercritical medium.

The polymerization reactants may include additives in cationic polymerizations such as proton traps (such as 2,6-di-tert-butylpyridine (DtBP)) or electron donors such as triethylamine, pyridine, and the like, and soluble salts like NBu₄NCl.

The polymer products have utility as precursors for macromolecular monomers, as telechelic polymers, as potential blocks in block copolymers made by coupling reactions, and use as polymers in a variety of formulated shaped products such as thermoplastics and thermosets. One specific use of butyl rubber is in tire innertubes or the inner liner of tubeless tires. The instance process has utility to make polyisobutylene and other cationically polymerizable polymers or copolymers at reduced cost while minimizing environmental pollution with halogenated organics.

The polymerizations shown in Tables I and II were run in a 300 mL high pressure Hastelloy ™ C(HC) reactor from Parr Instr. Co. rated to 200 bar. The reactor was equipped with a magnetic drive. The $CO_2$ contained approximately 32 ppm water. The TMPCl (2-chloro-2,4,4-trimethylpentane was synthesized and purified as described in *The Journal of Polymer Science, Polymer Chem. Ed.* 18, 1523 (1980), J. P. Kennedy and R. H. Smith. The reactor was purged with dry $N_2$ at 150° C. for at least 3 hours and charged in a dry box under $N_2$ with predetermined amounts of TMPCl, IB (isobutylene), cosolvent (hexane or $CH_3Cl$), additives (nBu₄NCl, DtBP), and with a sealed ampoule which contained the coinitiator (TiCl₄).

When the "aging" technique was used the TMPCl and TiCl₄ were premixed and stored under $N_2$ in a sealed ampoule at $-15°$ C. The $CO_2$ was delivered at $-58°$ to $-60°$ C. by using a high pressure, nylon reinforced hose at 185 psi for 15 minutes. Alternatively, the $CO_2$ can be delivered with a gas booster pump. One such pump is available from Haskel Co. The amount of $CO_2$ condensed in the reactor was determined by weight. The reactor was heated in a preheated thermostated water bath. The polymerization was started by breaking the ampoule containing the TiCl₄ or the TMPCl/TiCl₄ mixture. When the ampoule was broken, a slight pressure drop was noted. Samples were taken during some of the polymerizations through a sample valve and were quenched in methanol.

The polymerizations were stopped by adding methanol with an above-referenced Haskel Co. pump and releasing the pressure. The MeOH addition procedure took 2–3 minutes. The final product was dissolved in hexanes, filtered, and dried under vacuum. The $\overline{M}_n$ and $\overline{M}_w/\overline{M}_n$ were determined by gel permeation chromatography.

The results of $\overline{M}_n$ and $\overline{M}_w/\overline{M}_n$ determinations indicate that aging the initiator system prevents oligomer formation. Higher pressures, high coinitiator concentrations and high monomer concentrations favor polymerization.

Table I and II show some initial polymerization results in a 300 mL Parr reactor using carbon dioxide as the medium, 2-chloro-2,4,4 trimethylpentane (TMPCl) as initiator, and titanium tetrachloride (TiCl₄), boron trichloride (BCl₃) and tin tetrachloride (SnCl₄) as coinitiators. Experiments 1–9 were run in supercritical carbon dioxide (SC·$CO_2$). A small amount of (<5v %) of methyl chloride ($CH_3Cl$) was used to increase the solvating power of the SC·$CO_2$. The proton trap, 2,6-di-tert-butyl pyridine (DtBP) was added to the polymerization system in some cases (Table I). The polymerization times were varied to see if this affected the monomer conversion and the molecular weight of the polymer. The $M_w/M_n$ values of 1.4–2.6 are quite satisfactory for polymerizations under non-optimized conditions. The number average molecular weights are about 2000 in Exp. 3 through Exp. 9 using TMPCl/TiCl₄ and TMPCl/(TiCl4, BCl₃) initiator systems (Table I). The $M_n$ values are somewhat low for the TMPCl/SnCl₄ system. Table I Exps. 1–7 demonstrate the effect of the coinitiator and monomer concentrations on polymer yield during about 4 and 24 hrs. polymerizations. The use of BCl₃ in Exps. 7 and 8 increased the monomer conversion in 4 hour runs and the resulting polymers had $M_w/M_n$ values of 1.4–1.5. Exp. 9 in Table I demonstrates the importance of the use of SC·$CO_2$ under these conditions. In Experiment 9, at low pressure when just a small amount of $CO_2$ is present in the gas phase, the resulting polymer has a very broad molecular weight distribution and the polymer yield is less than 5%.

Experiments 10–15 in Table II demonstrate the effect of SnCl₄ concentration and polymerization time on the molecular weight and the yield of polymer., Exp. 15 (Table II) is a control experiment when the polymerization was carried out using the "H₂O"/SnCl₄ initiator system in the absence of added cationogen (TMPCl). The low polymer yield and molecular weight indicate that by using the TMPCl/SnCl₄ initiator system, the polymerization of IB indeed started from TMPCl.

TABLE I

POLYMERIZATION OF IB IN $CO_2$ INITIATED BY TMPCl/TiCl₄* INITIATOR SYSTEM ([TMPCl] = 0.001 mole)

| | | | CONDITIONS | | | | | | RESULTS | | |
|---|---|---|---|---|---|---|---|---|---|---|---|
| Exp. | T °C. | P Bar | TiCl₄ Mole | BCl₃ mole | CH₃Cl mL | DtBP Mole | Pol. Time hrs | IB Mole | Yield % | $M_n$ g/mole | $M_w/M_n$ |
| 1 | 36 | 100 | 0.027 | — | 14 | 0.0008 | 3.5 | 0.15 | 10 | 1000 | 1.5 |
| 2 | 32.5 | 125 | 0.027 | — | 13 | 0.0008 | 24 | 0.15 | 23 | 1200 | 1.9 |
| 3 | 32.5 | 125 | 0.027 | — | 15 | 0.0008 | 4 | 0.36 | 8.7 | 2000 | 2.3 |
| 4 | 32.5 | 125 | 0.027 | — | 15 | 0.0009 | 23 | 0.36 | 24.8 | 2200 | 2.2 |
| 5 | 32.5 | 122 | 0.036 | — | 15 | 0.0009 | 3.6 | 0.36 | 13.6 | 2000 | 2.2 |
| 6 | 32.5 | 113 | 0.036 | — | 14 | 0.0009 | 22 | 0.36 | 22 | 2300 | 2.7 |
| 7 | 32.5 | 129 | 0.036 | 0.024 | 14 | — | 4.0 | 0.36 | 45 | 2400 | 1.5 |
| 8 | 32.5 | 140 | 0.036 | 0.024 | 15 | — | 4.0 | 0.36 | 40 | 2000 | 1.4 |
| 9 | 32.5 | 20 | 0.036 | 0.024 | 15 | — | 3.8 | 0.36 | <5 | 2000 | 4.8 |

*The TMPCl/TiCl₄ initiator system was aged in a sealed ampoule for 20, 23, 2, 6, 9, 13, 16, 9, 14 days in the experiments number 1, 2, 3, 4, 5, 6, 7, 8, 9, respectively.

TABLE II

POLYMERIZATION OF IB IN SUPERCRITICAL CO₂ INITIATED
BY TMPCl/SnCl₄* INITIATOR SYSTEM. ([TMPCl] = 0.001 mole)

| | Conditions | | | | | | Results | | |
|---|---|---|---|---|---|---|---|---|---|
| Exp. | T °C. | P bar | SnCl₄ Mole | CH₃Cl mL | Pol. time hrs. | IB Mole | Yield % | $M_n$ g/mole | $M_w/M_n$ |
| 10 | 36 | 100 | 0.017 | — | 2 | 0.15 | 7 | 1050 | 3.4 |
| 11 | 36 | 125 | 0.017 | 10 | 3 | 0.15 | 30 | 1300 | 3.1 |
| 12 | 36 | 135 | 0.025 | 10 | 6 | 0.15 | 35 | 1700 | 1.7 |
| 13 | 36 | 90 | 0.025 | 10 | 23 | 0.15 | 30 | 2500 | 2.1 |
| 14 | 32.5 | 115 | 0.034 | 15 | 22 | 0.15 | 30 | 1500 | 1.6 |
| 15** | 32.5 | 85 | 0.020 | 10 | 23 | 0.15 | <1 | 900 | 1.9 |

*The TMPCl/SnCl₄ initiator system was aged in a sealed ampoule for 1, 4, 1, 5, 7 days in the experiments number 1, 2, 3, 4, 5, respectively.
**Control experiment carried out without TMPCl.

Experiments indicate that polyisobutylene can precipitate out of SC·CO₂ at number average molecular weights above 1000. However, the polymers continue to grow even though the system is heterogeneous. The solubility of the polymer in SC·CO₂ may result from the "hexane-like" nature of the medium as disclosed in J. F. Brennecke and C. A. Eckert, Phase Equilibria for Supercritical Fluid Process Design, *AIChE Journal*, 35, 1409 (1989).

Figure 2:
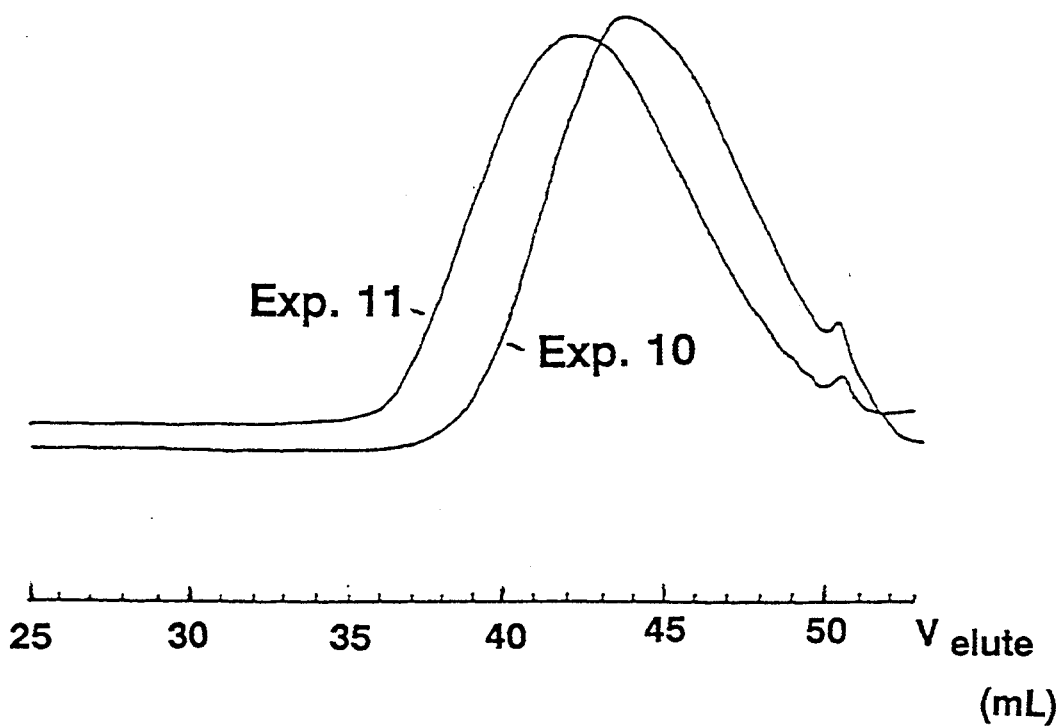
FIG. 2 is the gel permeation chromatography trace (using a refractive index (RI) detector) for samples 16 and 17 in Table III showing that the molecular weight of the polymer increases with polymerization time.

Table III shows a copolymerization of isobutylene and styrene in supercritical CO₂ with CH₃Cl cosolvent under conditions similar to the isobutylene polymerization in Table I. The amount of CO₂ used was 230 g. The conversion for Example 17 was 15%. FIG. 2 shows a gel permeation chromatography trace on the two samples in Table III. A low elution volume indicates a high molecular weight while a high elution volume represents a low molecular weight. In Exp. 16 the growing polymer chains were terminated after 1.1 hours. The resulting polymer had lower average molecular weight than in Exp. 17 where the polymerization was allowed to proceed for 2.3 hours. These data suggest that growing polymer chains have a long lifetime relative to 1.1 hours and that their molecular weight is somewhat controlled by the reaction time.

the peaks of the NMR spectrum associated with the protons identified as 3, 5, and 6 would be absent.

While in accordance with the Patent Statutes, the best mode and preferred embodiment has been set forth, the scope of the invention is not limited thereto, but rather by the scope of the attached claims.

What is claimed is:

1. A process for polymerizing monomers capable of cationic polymerization comprising:
   polymerizing one or more monomers into polymers or copolymers through carbocationic polymerization at temperatures from about 31.1° C. to about 60° C. and at CO₂ pressures from about 73 to about 10,000 bar in a medium comprising supercritical carbon dioxide, wherein said one or more monomers are isobutylene, and optionally one or more aromatic substituted vinyl monomers having from 8 to 12 carbon atoms and/or dienes having from 4 to 8 carbon atoms.

2. A process according to claim 1, wherein the pressure is from about 73 to about 200 bar, wherein at least 50 wt. % of the medium is carbon dioxide, and wherein said cationic polymerization is initiated with a cationogen and at least one Friedel-Crafts acid.

3. A process according to claim 2, wherein the poly-

TABLE III

| Exp. | IB mole | St mole | TMPCl/TiCl₄ mole/mole | Cosolv. Vol./Vol. CO₂* | Additive mole | Pmax bar | Polym. time hrs. |
|---|---|---|---|---|---|---|---|
| 16 | 0.24 | 0.087 | $5.9 \times 10^{-4}/1.82 \times 10^{-2}$ | 5/95 | DtBP 4.4 × 10⁻³ mole | — | 1.1 |
| 17 | 0.24 | 0.087 | $5.9 \times 10^{-4}/1.82 \times 10^{-2}$ | 5/95 | DtBP 4.4 × 10⁻³ mole | — | 2.3 |

*The vol./vol. unit is based on the total volume of the reactor being 300 mL.

These data can be compared to data by Y. Imanishi, T. Higashimura, and S. Okamura, Cationic Copolymerization of Isobutylene. III. Solvent Effect in Cationic Copolymerization of Isobutylene with Styrene in Mixed Solvents, *J. Polym. Sci.*, A(3), 2455 (1965), who used similar IB/St monomer charges and the TiCl₄ initiator in solvents of CH₂Cl₂/nC₆H₁₄~25/75 by wt. at −78° C. The authors in that reference found the mole ratio of the monomers in the copolymer to be similar to those found in Table II of about 70/30 mole IB/St. An interpretation of these results is that the reactivity ratios for these two comonomers are similar in the two solvents even though the reaction temperatures are quite different.

FIG. 3 shows the proton NMR spectrum of the copolymer produced in Table III. The peaks are identified in the Brief Description of the figures. If the recovered polymers were homopolymers instead of copolymers, mers formed have a number average molecular weight from about 1,000 to about 100,000 and wherein at least 80 wt. % of this medium is carbon dioxide.

4. A process according to claim 2, wherein said polymers are copolymers of said one or more monomers.

5. A process according to claim 3, wherein said at least one Friedel-Crafts acid is a mixture of two or more Friedel-Crafts acids.

6. A process according to claim 3, wherein said cationogen is a branched hydrocarbon having from 6 to 20 carbon atoms and at least one halide.

7. A process according to claim 6, wherein isobutylene is greater than 50 wt. % of said one or more monomers.

8. A process according to claim 7, wherein isobutylene is present in amounts greater than 90 wt. % of said one or more monomers and said medium contains less than 10 wt. % cosolvents.

9. A process according to claim 2, wherein said one or more monomers are said isobutylene and said one or more dienes.

10. A process according to claim 8, wherein said carbon dioxide medium includes one or more cosolvents.

11. A process for inserting monomers having at least one unsaturated carbon-carbon double bond between a carbocation and a counterion to said carbocation forming a polymer, said process comprising:

reacting in a medium a Friedel-Crafts coinitiator, a cationogen, and one or more monomers having at least one carbon-carbon double bond, thereby forming first carbocations and counterions, said medium comprising carbon dioxide at from 31.1° C. to about 60° C. and 73 bar to about 10,000 bar; and subsequently inserting said monomers between the carbocations and their counterions in a polymerization process and forming a polymer, wherein said monomers are isobutylene and optionally one or more aromatic substituted vinyl monomers having from 8 to 12 carbon atoms and/or dienes having from 4 to 8 carbon atoms.

12. A process according to claim 11, wherein isobutylene is greater than 50 wt. % of said one or more monomers and said pressure is from 73 bar to 200 bar.

13. A process according to claim 11, wherein the resulting polymer has a number average molecular weight from about 1,000 to about 100,000.

* * * * *